United States Patent Office.

PETER SPENCE, OF NEWTON HEATH, MANCHESTER, GREAT BRITAIN.

Letters Patent No. 110,084, dated December 13, 1870.

IMPROVEMENT IN THE MANUFACTURE OF ALUM AND FERTILIZERS FROM MINERAL PHOSPHATES.

The Schedule referred to in these Letters Patent and making part of the same.

*To all whom it may concern:*

Be it known that I, PETER SPENCE, of Newton Heath, Manchester, in the county of Lancaster, in Great Britain, have invented "Improvements in the Manufacture of Alum, and in obtaining products in such manufacture applicable to certain useful purposes;" and I do hereby declare that the following is a full, clear, and exact description thereof, which will enable others skilled in the art to make and use the same.

My invention consists in the use of certain compounds of alumina and phosphoric acid, particularly of such compounds of alumina, iron, and phosphoric acid at present obtained in the Island of Rodondo, near Antigua, in the West Indies, and known under the name of Rodondo phosphate, and of minerals of similar composition obtained in other West India Islands and other places.

These minerals I find contain from twelve to twenty per cent. of their weight of alumina, and this alumina I propose to utilize by the manufacture of alum, and, by so extracting it, leave phosphoric compounds in a condition suitable for artificial manures, the presence of the said alumina being detrimental to their use for that purpose.

I take the mineral as obtained from the said islands, or elsewhere, and grind it to a powder, passing it through a sieve of say twenty meshes to the inch. To this powder I add an equal weight of sulphuric acid of specific gravity; one-sixth if the mineral contains twenty per cent. of alumina, but only three-fifths of its weight if it contains only twelve per cent. of alumina, and apply heat, which I prefer to do by blowing steam into the vessel containing the mixture. The mineral dissolves and the specific gravity rises.

I now cautiously reduce, by application of water or weak liquors from subsequent parts of the process, (especially the washings of the sediment named afterward,) constantly boiling till all is dissolved except the insoluble sediment, and the strength of the liquor is reduced to 90° Twaddle or 1.45.

I now pass this liquor into a close vessel, and distil into it vapor containing ammonia obtained from gas ammoniacal liquor, subjected to boiling either by fire or steam injected into said gas-liquor, and the quantity of said gas-liquor I use is equal to six hundred to nine hundred gallons to each ton of the mineral, according to its richness.

When all the ammonia has been so distilled into the mineral liquor I allow it to settle for a few hours, and then run off all the clear solution (now at a strength or specific gravity of 1.4 or 80° of Twaddle's hydrometer) into lead coolers to crystalize alum, as is well known, and I allow it to remain in these coolers for some days, with frequent stirring, in order to obtain all the alum possible from the solution.

The mother-liquors, having deposited all the alum that can be obtained, are now a solution of a small quantity of sulphate of alumina and iron, some sulphate or phosphate of ammonia and a considerable quantity of phosphoric acid.

If it is required that the subsequent product should be largely charged with ammonia, a weak ammoniacal solution may be added to it, taking care not to cause precipitation of the phosphoric acid with the alumina or other bases in the liquid; but I prefer to take the said mother-liquors direct from the coolers, and add to them dry sawdust, just sufficient to absorb all the said liquors, so that none will run from the sawdust.

I now take this substance and dry it at a low heat, so as not to char the sawdust, and, when dry, it forms an artificial manure containing phosphoric acid and ammonia in such quantities and condition as to make it a most valuable fertilizer.

Instead of the ammonia-gas liquor used with the mineral solution to produce alum, salts of potash may be used, either the chloride of potassium of commerce or preferably sulphate of potash, as, although chloride of potassium will yield a sufficient product of alum, the fertilizer would, from its use, have a tendency to deliquesce, but sulphate of potash will not cause this evil.

I claim—

The mineral phosphates, containing alumina for the manufacture of alum, and the residual liquors from the said manufacture of alum for conversion into and as artificial manures or fertilizers.

PETER SPENCE.

Witnesses:
    WM. TUDOR MABLEY,
        *St. Ann's Street, Manchester,*
    W. T. CHEETHAM,
        *St. Ann's Street, Manchester.*